May 17, 1960

A. R. PAZ 2,936,487

PROCESS OF SHAPING THERMOSETTING
GLASS-FILLED MOLDING COMPOUNDS

Filed Oct. 4, 1955

INVENTOR.
ALFRED R. PAZ,
BY *Arthur J. Plantamura*

ATTORNEY.

United States Patent Office 2,936,487
Patented May 17, 1960

2,936,487

PROCESS OF SHAPING THERMOSETTING GLASS-FILLED MOLDING COMPOUNDS

Alfred R. Paz, Bound Brook, N.J., assignor to American Cyanamid Company, New York, N.Y., a corporation of Maine Application October 4, 1955, Serial No. 538,506

3 Claims. (Cl. 18—48)

This invention relates to the production of glass-filled resinous molding compositions. More particularly, this invention relates to a novel process for pelleting and effecting a uniform dispersion and orientation of glass fibers in resinous molding compositions.

The process is broadly adaptable to all kinds of moldable plastic material. It is particularly adaptable to synthetic resins of both thermoplastic and thermosetting types. Examples of such synthetic resins are triazine-formaldehyde condensation products, e.g., melamine-formaldehyde condensation products; phenol-aldehyde condensation products; urea-aldehyde condensation products; styrene polymers; acrylonitrile polymers; polymers of various acrylic acid and methacrylic acid esters, e.g., vinylchloride polymers; copolymers of styrene and acrylonitrile; cellulosic ester molding materials, e.g., cellulose acetate, and also copolymers of unsaturated polyacids with various polymeric compounds, such as styrene, vinyl acetate, diallyl phthalate, and the like. These materials are illustrative only of the synthetic resins which may be treated in accordance with the process of this invention. The present invention will be described in detail in connection with glass-filled aminoplast resins, and particularly melamine formaldehyde reaction products, but it will be apparent that the process is adaptable to other molding compounds, both thermosetting and thermoplastic.

The aminoplast resins, of which melamine-formaldehyde and urea-formaldehyde resins are typical, are heat-curable and are characterized by their outstanding resistance to heat, excellent electrical properties, and by their lower-water absorption properties. When admixed with glass fibers, and molded, these resins provide a material having in addition to the outstanding properties mentioned unusually high mechanical strength and particularly impact strength.

Prior to my invention when glass-filled resins have been employed, it has been customary to impregnate glass fibers or glass cloth or fabric with the resinous composition, and then chop or comminute the material to a size suitable for molding. This practice of impregnating glass cloth, and subsequently chopping or dividing the material into a size suitable for molding, as for example, the method described in U.S. Patent 2,344,733 to Kurt E. Ripper, is a relatively time-consuming and expensive procedure and requires special equipment and/or a good deal of manual labor to handle the impregnation and subsequent chopping of the glass sheets into a size and form providing a density suitable for filling the mold.

In those instances where glass fibers, as distinguished from glass fabric, have been impregnated with resinous composition, the result has generally been a heterogeneous mix consisting of non-uniform sized clusters of fibers stuck at random in the resinous material. Prolonged mixing or working of this material does not reduce the lumpiness or variable size of these aggregates nor alter the random arrangement of glass fiber therein. It is therefore necessary, in order to get the aggregate to a size and density suitable for molding, to chop or comminute the aggregate in order to reduce the size of the larger aggregates. This operation results in an excess of unsaleable and dusty fines and produces a substantial variation in the size of the glass fiber in the product and thus an inferior impact strength. These deficiencies in the prior art are believed due to several factors, among which the main contributors are (1) the chopping or comminuting operation to provide a composition of suitable size and density for molding, (2) the prolonged mixing time utilized in attempting to effect as uniform a dispersion of the glass fiber in the resinous composition as possible and (3) the disorderly or random arrangement of the glass fiber in the molding aggregates. The glass fiber-filled material of the prior art, because of the random arrangement of the fibers in the aggregate, not only causes difficulty in filling mold, but the material is also somewhat hazardous to handle because of the haphazard way the brittle fibers protrude from the aggregate. The foregoing disadvantages are obviated by the present invention. In addition to these shortcomings, the glass fiber-filled molding material of the prior art, due to its nature and arrangement, has caused considerable difficulty in molding operations, and thereby has severely restricted the promotion and sale of these compositions. Efforts to comminute the material to reduce the lumps to a usable and more uniform size have not proven satisfactory, as the procedures have been expensive, and as previously indicated, the product has been characterized by excessive dust and non-uniform strength.

In an effort to avoid these shortcomings, attempts have been made to produce this compound by impregnating and then chopping strands of glass yarn, rather than from impregnating loose staple-sized fibers; but the operations necessary for the handling and chopping of long strands again require expensive equipment. Moreover, this procedure is a relatively slow process. The use of relatively shorter length (less than ¼ inch) chopped glass fibers has been attempted in efforts to produce a more uniform aggregate. Although some success has been achieved, the results were generally unsatisfactory, largely because of the decline in physical properties, particularly in the lowered impact strength of the material produced.

I have found that when a pressure lid is lowered into the cavity of a conventional mixer, such as a Baker-Perkins standard mixer, and held in place by clamps so that the cover or lid clears the rotating blades of the mixer to the extent that the plastic glass-filled mass is kneaded as it is pressed against the lid, the effect is radical and unique. The lumps begin to break up as they are rolled and the material forms oriented bundles of fibers held by resin and gradually evolves into pellets of substantially uniform size.

The accompanying drawings will aid in illustrating the teaching of the process of the present invention.

Figure 1:
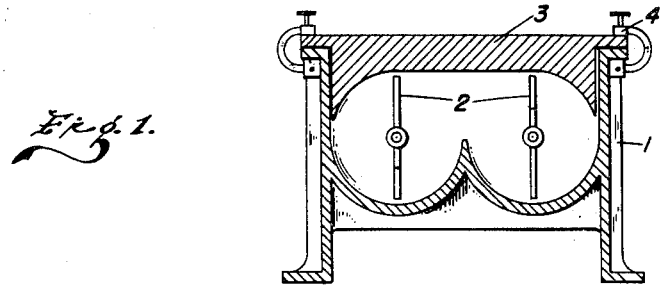
Figure 1 shows a side view in cross section of a conventional mixing apparatus with a pressure lid clamped over the mixing chamber.

It it an obeject of my invention to provide a glass-filled resinous molding composition which may be molded under standard conditions and which can be produced by minor modification of conventional existing equipment in a form suitable for molding. More specifically, it is an object of the present invention to provide a process for making glass-filled pellets of molding composition wherein the fiber is uniformly dispersed and uniformly oriented in the pellet. Various other objects and advantages of my invention will be apparent as the present description proceeds.

After the glass fibers and other components of the molding composition are blended, the mass is kneaded and rolled as the material is forced against the sides and lid of the mixer. This operation produces pellets of substantially uniform particle size having glass fibers uniformly dispersed and uniformly oriented therein. The material may be dried, molded, and heat-cured under standard conditions to produce a material having a greatly increased degree of uniformity and superior physical characteristics. The improvement is directly attributable to the process by which the molding composition is formed. Failure to obtain a uniform dispersion by prior art methods is undoubtedly due to the physical form and the nature of the glass fibers which have relatively poor mobility, as compared to the nature of other ingredients and fillers, and continued mixing with glass fibers even for lengthy periods fails to provide uniformity. Furthermore, it has been found that the continuous and prolonged mixing or churning action on the glass-filled mass in an effort to effect uniform distribution damages the fibers, and consequently, results in a weaker molded material. According to the invention, a pressure lid having a concave shape contoured to the arc of and clearing the rotating blades of the mixer by about one-half to four inches, the distance depending generally on the quantity and consistency of the mix, is lowered into the mixer cavity and is held in place by means of clamps. The kneading action of the mixer blades as the material is masticated against the mixer walls and lid has an unusual and unexpected effect upon the resinous aggregate. The aggregates with glass fibers, stuck at random in the resin break up and the mixture forms pellets having the glass fibers in each pellet uniformly oriented in a substantially uniform direction. The pressure lid mixing, according to the invention, requires from about fifteen minutes to about ninety minutes, depending on the nature and condition of the resinous material, the mixer blade clearance, and the size of the batch. During this period, when the material is mechanically kneaded, the pressure lid is removed periodically to note the degree of orientation in the mix. The end point in the pressure lid mixing is characterized by the formation of small (i.e., of the order of one-sixteenth of an inch in diameter) cotton-like balls of resin attached to the fibers protruding from the otherwise substantially uniformly sized pellets. The size of the pellet obtained is about one-fourth of an inch in diameter and about one inch in length when ½ inch glass fibers are used and slightly smaller when shorter fibers are utilized. The mix is then dumped, screened, if desirable, and dried. Due to the substantially uniform size of the pellets and greater density occasioned by alignment of the glass fibers in the pellet, the molding operation is facilitated and a molded article having glass fibers uniformly dispersed therein is obtained.

In order that the present invention may be more fully understood, the following examples are set forth for purposes of illustration only, and any specific enumeration of details should not be interpreted as a limitation, except as expressed in the appended claims. All parts used are parts by weight.

RESIN MANUFACTURE

*Example 1*

162 parts by weight of formaldehyde (thirty-seven percent by weight formaldehyde in water) and 126 parts by weight of melamine are adjusted to a pH of between 7 and 9 with sodium hydroxide. The mixture is heated to a temperature of between 190° F. and 200° F., and reacted at this temperature until two drops of the resin syrup, when added to 25 cc. of distilled water at between 5° C. and 10° C., permanently clouds the water at this temperature range, but not above it. The resin syrup is cooled to between 135° F. to 145° F. and the pH is adjusted to between 8.5 to 9.5 with sodium hydroxide. The reaction product is then ready for compounding with the glass fibers.

A dry product may be obtained, following the procedure of Example 1, by spray-drying the resinous composition at the end of the reaction and at the point of cooling.

*Example 2*

The preparation of a urea-formaldehyde resin, suitable for mixing and compounding with the glass fibers according to the process of the instant invention, may be prepared as follows:

174 parts of a thirty-seven percent aqueous formaldehyde solution and 62.2 parts of urea are charged into a suitable reaction vessel and the pH of the mixture is adjusted to 7.8 to 8.0 by the use of 10 N NaOH. The solution is then heated to reflux and is then held at this temperature for about 15 minutes. The syrup is then cooled to about 90° C. and 13.8 parts of urea are added, the pH of the solution then being about 5.5 to 5.8. The mixture is then heated again to reflux and held at that temperature for two hours. The pH is raised to about 7.8 to 8.0 by addition of a sufficient quantity of sodium hydroxide, and the syrup is then cooled to about 25° C.

The glass fibers, and other materials if desirable, may be added directly to the resinous syrup at this stage and mixed under the pressure lid technique of the invention; or the syrup may be spray-dried by conventional methods to yield a finely divided soluble powder, which, at a convenient time, may, in conjunction with a suitable solvent, be combined with the glass fibers according to the pressure mixing concept of the invention.

Figure 3:
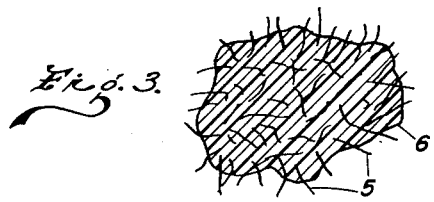
Figure 3 is illustrative of the nature of the resinous glass-filled aggregate in cross section made by conventional mixing techniques without the application of the pressure lid during the mixing operation.

The compounding of the glass-filled resin to form pellets will be more fully understood by referring in detail to the drawings, where 1 represents a conventional mixing machine with dual blades 2 which mix or churn the material. The lid 3 is held firmly in position by any conventional means, such as the clamp 4, so that during the mixing the material which tends to raise the lid is kneaded against the wall of the mixer 1 and the inner surface of the lid 3. By prior methods, where no lid at all was used or where a flat dust cover was placed over the apparatus to reduce contamination or evolution of dust particles and the like, the composition tumbled freely in the mixer and formed a variable-sized heterogeneous aggregate, such as illustrated in Figure 3 with the glass fibers 5 haphazardly adhered to the resinous mass 6 providing a difficult to mold aggregate. When the resinous mass is mixed under the pressure lid, according to the teaching of the present invention, the glass-filled resinous mass is kneaded and rolled under mechanical pressure as the material is forced against the lid 3 by the rotating spiral blades until it breaks up into substantially uniform pellets. These pellets assume the generally ellipsoidal shape shown in Figure 4 in somewhat enlarged size. The kneading and rolling of the mass against the lid has the effect of orienting the fibers 7 in a substantially uniform direction in the resinous pellet 8 as shown. The result is a denser molding compound, easier to handle and to mold and having a more uniform consistency and providing a product of higher impact strength. The end point in the mixing-pelleting operation, i.e., where the material is fully pelletized, is evidenced by the formation of small spheres 9 on the fibers 8 which protrude from the ends of the pellet 8.

COMPOUNDING OF THE GLASS-FILLED RESIN

Example 3

Figure 2:
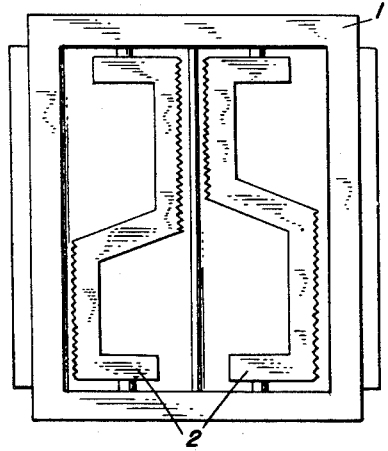
Figure 2 is a top view of the mixture with the pressure lid removed and showing the mixing blades.
Figure 4:
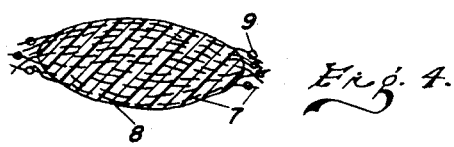
Figure 4 is illustrative of the nature of the product, in cross section, made under a pressure lid according to the teaching of the instant invention.

In standard mixing equipment common to the trade, such as that illustrated in Figures 1 and 2, the syrup of Example 1 is mixed with the glass fibers and other suitable ingredients, such as zinc stearate lubricant and inert fillers, and mixed for about ten minutes or until there is a substantially even distribution of the components according to the following procedure: To the resin syrup in the mixer prepared according to the procedure of Example 1, lubricant and dry resin are added as an intimate blend through a 4-mesh screen in 5 to 10 minutes, and mixed for about ten minutes or until the mix is homogeneous. China clay is then added through a 4-mesh screen until thoroughly wetted, and finally the glass fibers of one-quarter-inch size (one-half-inch size may be used) are added in suitable portions and allowed to mix 5 to 10 minutes. Thereafter, the mixer walls and rotating blades are scraped clean. At this stage, the mix consists of clusters of fibers stuck at random to the enriched resin syrup forming aggregates soft, wet, and sticky. Further mixing under these conditions does not reduce the lumpiness characteristic of this type of material. A concave pressure lid is then lowered into the mixer cavity and held in place by means of clamps, so that the lid clears the rotating mixing blades by one to two inches. It is apparent that the resinous mix at this stage may be subjected to other suitable apparatus which will effect a similar kneading and rolling operation on the resinous mix. As the mixing continues, the mass is kneaded against the pressure lid by the rotating mixer blades, the variable-sized clusters or lumps begin to break up and the mass forms oval aggregates having fibers oriented therein in a substantially uniform direction. Continued mixing gradually forms the resin and fibers into pellets of substantially uniform size. The compounding operation requires from 20 to 40 minutes pressure mixing, during which the pressure lid is removed periodically to note the degree of orientation of the composition. Depending on the consistency, a shorter mixing period of as low as five minutes may be employed. At the end point of the mixing, kneading and rolling operation, the mix consists of fairly loose small and distinct bunches of well-oriented fibers bound in a resinous pellet as shown in Figure 4. For one-quarter-inch chrome-sized glass fibers, the pellets which form are about one-fourth of an inch in diameter and about one inch in length. The end point is characterized by the appearance of small cotton-like balls of approximately one-sixteenth of an inch in diameter, as shown at 9 in Figure 4, which are attached to the fibers protruding from the pellet. The mix is then dumped, screened if desired, and dried.

Example 4

The procedure of Example 2 is repeated, except that one-half-inch glass fibers instead of one-fourth-inch fibers are employed. The mixture is allowed to mix under the kneading and masticating operation of the mixer with the pressure lid clamped in position for 30 to 90 minutes, until the material is gradually transformed into pellets, fairly spherical in shape, about five-sixteenths of an inch in diameter, and about one inch in length.

The materials processed according to the methods of Examples 2 and 3 exhibit no problems in filling the mold, have an excellent density, handle and store remarkably well, and provide a product having superior and uniformly high impact strength.

In the preparation of the molding compositions of my invention, various fillers may be added with the glass fiber, or the resin may be made to have the desired doughy consistency suitable for pelleting by adding solely glass fibers and dried resin. Illustrated examples of fillers that may be incorporated are clay, alpha cellulose, wood flour, walnut shell flour, calcined or natural asbestos, finely divided silicon carbide, carbon black, graphite, diatomaceous earth, slate dust, powdered rutile, powdered or flaked mica, powdered quartz, cloth cuttings, e.g., cutings of silk, rayon, wool, linen, cotton, nylon, Dacron or polymeric or copolymeric acrylonitrile fibers, and the like, ground cork, sand, etc. The proportions of fillers present may be varied as desired or as conditions may require. Thus depending on the particular filler employed and the intended use of the molded article, the filler and the glass fibers may constitute, for example from five percent to eighty percent by weight of the molding composition. It is apparent that no filler, in addition to the glass fibers, need be present in certain applications.

In certain instances, curing agents, such as phthalic anhydride, paratoluene sulphonic acid, phthalic acid, benzoyl peroxide, and the like may also be incorporated into the resinous molding composition.

Mold lubricants may also be incorporated into the composition to facilitate molding of the glass-filled resin. Examples of suitable mold lubricants are zinc stearate, zinc palmitate, calcium stearate, glycerol monostearate, and the like. These additives may be incorporated into the molding compositions in proportions sufficient to produce certain desired molding characteristics.

By carefully selecting the colorants introduced into the mixture, a final product of any desired color may be obtained. Illustrative examples of colorants that may be introduced into the mixture include cadmium yellow, cadmium red, cadmium maroon, titanium dioxide, black iron oxide, chrome green, gold, silver, aluminum, and copper. Suitable dyes include alizarine red, Prussian blue, auramin, naphthol, and malachite green. The amount of the colorants, catalysts and mold lubricants that are introduced into the mixture are such that the desired properties of the molded objects are obtained. Thus, for example, where a fast-curing object is desired, it is apparent that a larger amount of catalyst will be introduced into the mixture. The amount of the colorant may also vary, depending upon the depth and shades of color desired. When a dark rich color is desired, colorants in an amount up to about 20% by weight may be used. Generally from about 0.5% to about 15% by weight of the colorant may be used to give any color desired. Obviously when a clear molding composition is desired, no colorant will be introduced into the reaction mixture.

Obviously, many modifications and variations in glass-filled resinous compositions may be made without departing from the scope of this invention.

It will be understood that the essence of the present invention resides in providing an even distribution and orientation of glass fibers in pellets of substantially uniform size and of improved density by a process which includes mixing, kneading, and rolling of the glass-filled resin under a lid firmly held near the rotating mixing blades until the transformation of the variable-sized agglomerates into pellets has taken place.

The high shock resistance and excellent electrical properties of molded articles made according to the instant invention render them particularly suitable for use in the manufacture of articles requiring exceptional electrical and/or physical properties.

I claim:

1. A process for preparing generally ellipsoidal shaped resinous aggregates containing glass fibers substantially oriented in the direction of the major axis and evenly distributed therethrough which comprises subjecting glass fibers having a length from about 0.25 to 0.5 inch and an aqueous solution of a thermosetting resin selected from the group consisting of a melamine-formaldehyde condensate and a urea-formaldehyde condensate capable of forming a kneadable mixture with said fibers to the kneading and rolling action of paired planular sigma blades having serrations on their leading edges confined in a cavity having substantially continuous fixed walls wherein the outward extremities of said blades define a surface of revolution proximately adjacent to the surface of said walls.

2. A process for preparing generally ellipsoidal shaped resinous aggregates containing glass fibers substantially oriented in the direction of the major axis and evenly distributed therethrough which comprises subjecting glass fibers having a length from about 0.25 to 0.5 inch and an aqueous solution of a thermosetting melamine-formaldehyde condensate capable of forming a kneadable mixture with said fibers to the kneading and rolling action of paired planular sigma blades having serrations on their leading edges confined in a cavity having substantially continuous fixed walls wherein the outward extremities of said blades define a surface of revolution proximately adjacent to the surface of said walls.

3. A process for preparing generally ellipsoidal shaped resinous aggregates containing glass fibers substantially oriented in the direction of the major axis and evenly distributed therethrough which comprises subjecting glass fibers having a length from about 0.25 to 0.5 inch and an aqueous solution of a thermosetting urea-formaldehyde condensate capable of forming a kneadable mixture with said fibers to the kneading and rolling action of paired planular sigma blades having serrations on their leading edges confined in a cavity having substantially continuous fixed walls wherein the outward extremities of said blades define a surface of revolution proximately adjacent to the surface of said walls.

References Cited in the file of this patent

UNITED STATES PATENTS

| | | |
|---|---|---|
| 1,518,129 | Banbury | Dec. 9, 1924 |
| 2,383,604 | Leistensnider et al. | Aug. 28, 1945 |
| 2,582,327 | Haine | Jan. 15, 1952 |
| 2,602,074 | Kropa et al. | July 1, 1952 |
| 2,639,277 | Varela | May 19, 1953 |
| 2,755,509 | Smidth | July 24, 1956 |

FOREIGN PATENTS

| | | |
|---|---|---|
| 480,637 | Canada | Jan. 29, 1952 |